United States Patent
Kim et al.

(10) Patent No.: US 9,650,865 B2
(45) Date of Patent: May 16, 2017

(54) AUTONOMOUS ACTIVE FLOW CONTROL VALVE SYSTEM

(71) Applicants: Namhyo Kim, Houston, TX (US); Kai Sun, Missouri City, TX (US); Luis Phillipe Costa Ferreira Tosi, Houston, TX (US); Krystian K. Maskos, Houston, TX (US); Thomas Gary Corbett, Willis, TX (US)

(72) Inventors: Namhyo Kim, Houston, TX (US); Kai Sun, Missouri City, TX (US); Luis Phillipe Costa Ferreira Tosi, Houston, TX (US); Krystian K. Maskos, Houston, TX (US); Thomas Gary Corbett, Willis, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 239 days.

(21) Appl. No.: 14/528,863

(22) Filed: Oct. 30, 2014

(65) Prior Publication Data

US 2016/0123111 A1 May 5, 2016

(51) Int. Cl.
| | |
|---|---|
| *E21B 34/16* | (2006.01) |
| *E21B 34/08* | (2006.01) |
| *G05D 7/06* | (2006.01) |
| *E21B 47/06* | (2012.01) |
| *E21B 47/00* | (2012.01) |
| *E21B 43/12* | (2006.01) |
| *E21B 43/14* | (2006.01) |

(52) U.S. Cl.
CPC ............. *E21B 34/08* (2013.01); *E21B 43/12* (2013.01); *E21B 43/14* (2013.01); *E21B 47/00* (2013.01); *E21B 47/06* (2013.01); *E21B 47/065* (2013.01); *G05D 7/0641* (2013.01)

(58) Field of Classification Search
CPC ......... E21B 34/066; E21B 34/08; E21B 34/16
USPC ........................................................ 166/66.6
See application file for complete search history.

(56) References Cited

U.S. PATENT DOCUMENTS

| | | | |
|---|---|---|---|
| 6,046,685 A | 4/2000 | Tubel | |
| 6,112,817 A * | 9/2000 | Voll | ........................ E21B 34/08 166/370 |

(Continued)

FOREIGN PATENT DOCUMENTS

WO     WO 01/65063     9/2001

OTHER PUBLICATIONS

Written Opinion and Search Report for PCT/US2015/058067 mailed May 3, 2016.

*Primary Examiner* — Kenneth L Thompson
(74) *Attorney, Agent, or Firm* — King & Spalding LLP

(57) ABSTRACT

An autonomous active flow control valve system for regulating and controlling flow across well segments is disclosed. In one example embodiment, the valve system includes a central control unit and one or more flow control devices communicatively coupled to the central control unit. Each flow control device includes at least one valve and at least one sensor for sensing various well or flow parameters. The central control unit receives sensor data from the sensor and controls the valve according to a pre-programmed control protocol. The valve may be opened, closed, and adjusted in response to detected well or flow parameters in order to maintain a desirable flow profile across well segments either in production or injection well.

19 Claims, 7 Drawing Sheets

(56) References Cited

U.S. PATENT DOCUMENTS

| | | | |
|---|---|---|---|
| 6,786,285 B2 | 9/2004 | Johnson et al. | |
| 7,891,430 B2 * | 2/2011 | Willauer | E21B 34/066 166/373 |
| 2009/0151950 A1 * | 6/2009 | Patel | E21B 47/12 166/298 |
| 2014/0000909 A1 * | 1/2014 | Neer | E21B 34/108 166/373 |
| 2016/0010427 A1 * | 1/2016 | Kelbie | E21B 34/16 166/373 |
| 2016/0032683 A1 * | 2/2016 | Wood | E21B 43/14 166/308.1 |
| 2016/0115766 A1 * | 4/2016 | Tosi | E21B 43/128 166/373 |

* cited by examiner

AUTONOMOUS ACTIVE FLOW CONTROL VALVE SYSTEM

TECHNICAL FIELD

The present application relates to flow control valve systems for oil and gas recovery applications. Specifically, the present application relates to an autonomous flow control valve system capable of controlling flow in a plurality of well zones without intervention.

BACKGROUND

Horizontal production wells often exhibit varied flow rates along the length of the well. This is typically due to frictional pressure losses, also known as the heel-toe effect, in which the flow rate near the heel of the well is greater than the flow rate at the toe end of the well. This effect can negatively impact the recovery efficiency of the well. Flow control devices have been used to regulate flow rates at various portions of the well in order to normalize the flow rates across the producing length of the well. Flow control devices are typically placed on the production tubing and act as a valve, regulating the flow of fluids from the well into the production tubing. One type of an flow control device is a passive flow control device, which includes a valve having a fixed geometry or size. Typically, one or more passive flow control devices are placed along the production tubing, with those having smaller valve openings placed near the heel of the well and those with larger valve openings placed towards the toe of the well. However, since passive flow control devices have fixed valve opening sizes, once the device is deployed downhole, the valve size cannot be changed. Thus, the passive flow control device is not capable of responding to changes in the natural flow rate of the reservoir. In a typical example, early on during recovery, a first segment of the well may exhibit a greater flow rate than a second segment of the well. As such, a passive flow control device having a smaller valve size would be deployed near the first segment and a passive flow control device having a larger valve size would be deployed near the second segment in order to normalize the flow rates. However, later on during recover, the flow rate may slow in the first segment due to various factors such as decreased pressure, changes in fluid velocity, etc. Thus, it would be advantageous to be able to change the valve opening size to compensate for this change.

SUMMARY

In general, in one aspect, the disclosure relates to an autonomous active flow control valve system. The valve system includes at least one downhole flow control device. The flow control device further includes a valve, a local controller coupled to the valve and configured to control actuation of the valve, and at least one sensor configured to sense at least one parameter. The valve system also includes a central control unit communicatively coupled to the at least one local control unit. The central control unit includes a central processor configured to receive one or more outputs of the at least one sensor and provide one or more outputs to the local controller for controlling the valve, the one or more outputs determined based on a pre-programmed protocol stored in the central processor.

In another aspect, the disclosure can generally relate to an autonomous active flow control valve system. The valve system includes a first downhole flow control device and a second downhole flow control device. The first downhole flow control device includes a first valve configured to control the flow of a fluid from a reservoir into the valve system, a first local controller coupled to the valve and configured to control actuation of the first valve, and at least one first sensor communicatively coupled to the first local controller and configured to sense at least one parameter relevant to the first downhole flow control device. The second downhole flow control device includes a second valve configured to control the flow of a fluid from a reservoir into the valve system, a second local controller coupled to the valve and configured to control actuation of the second valve, the second local controller communicatively coupled to the first local controller, and at least one second sensor communicatively coupled to the first local controller and configured to sense at least one parameter relevant to the second downhole flow control device. The first local controller controls the valve based on one or more outputs of the at least one first sensor and the at least one second sensor, and based on a pre-programmed protocol stored in the first local controller.

In another aspect, the disclosure can generally relate to an autonomous active flow control valve system. The valve system includes at least one downhole flow control device comprising a valve and at least one sensor configured to sense at least one parameter. The valve system also includes a central control unit communicatively coupled to the at least one flow control device. The central control unit further includes a central processor configured to receive one or more outputs of the at least one sensor and provide one or more control commands to the valve, the one or more control commands determined based on a pre-programmed protocol stored in the central processor.

These and other aspects, objects, features, and embodiments will be apparent from the following description and the appended claims.

BRIEF DESCRIPTION OF THE DRAWINGS

The drawings illustrate only example embodiments of the present disclosure, and are therefore not to be considered limiting of its scope, as the disclosures herein may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements. In one or more embodiments, one or more of the features shown in each of the figures may be omitted, added, repeated, and/or substituted. Accordingly, embodiments of the present disclosure should not be limited to the specific arrangements of components shown in these figures.

DETAILED DESCRIPTION OF EXAMPLE EMBODIMENTS

Figure 1:
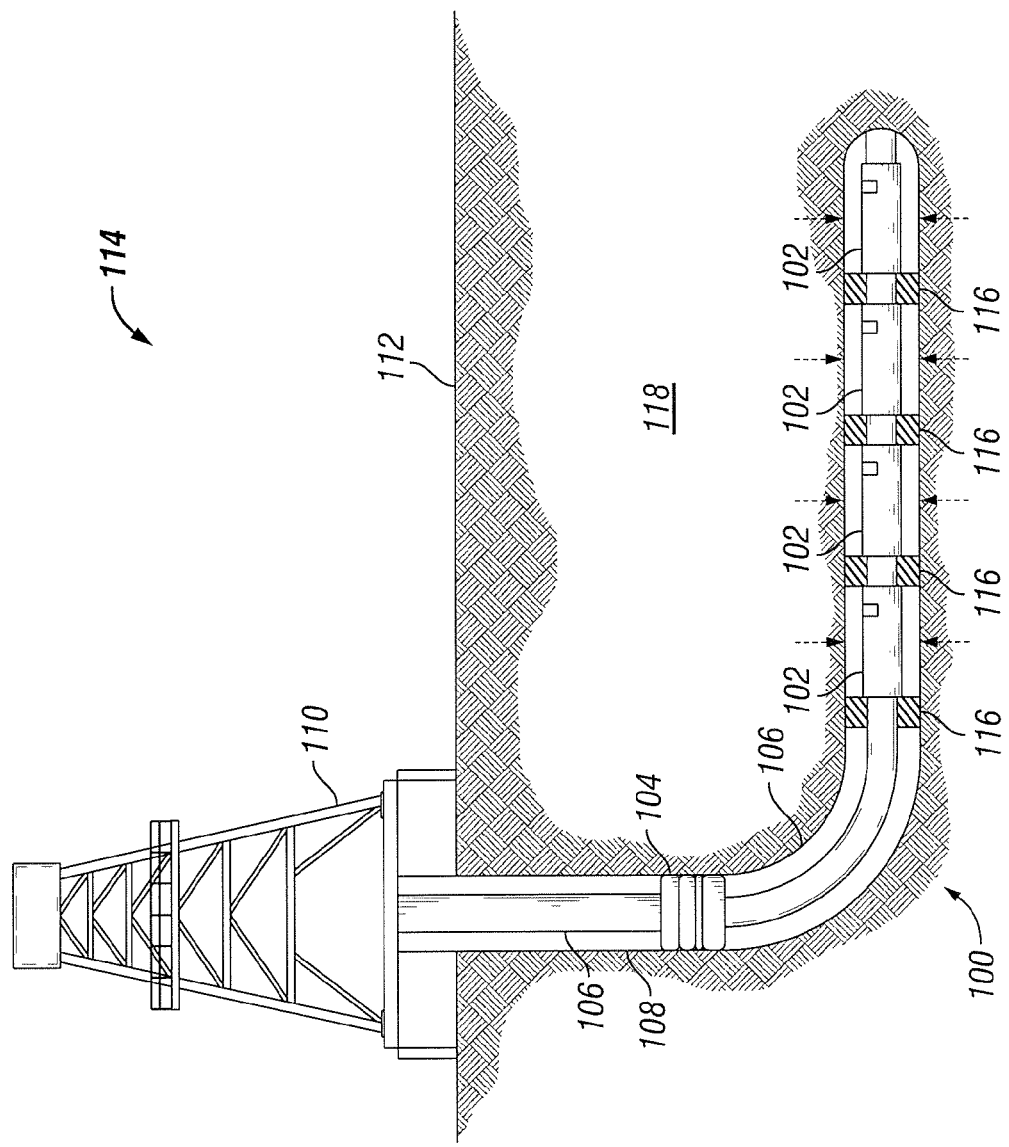
FIG. 1 illustrates a schematic diagram of a well site in which an autonomous active flow control valve system has been deployed downhole, in accordance with example embodiments of the present disclosure.

Example embodiments directed to an autonomous active flow control valve system will now be described in detail with reference to the accompanying figures. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments disclosed herein may be practiced without these specific details. In other instances, well-known features have not been described in detail to avoid unnecessarily complicating the description. The example embodiments illustrated herein include certain components that may be replaced by alternate or equivalent components in other example embodiments as will be apparent to one or ordinary skill in the art.

Referring now to the drawings, FIG. 1 illustrates a schematic diagram of a well site 114 in which an autonomous active flow control valve system has been deployed downhole, in accordance with example embodiments of the present disclosure. In certain example embodiments, and as illustrated, the autonomous active flow control valve system 100 (hereinafter "valve system") is deployed in a horizontal wellbore 108. The wellbore 108 is formed in a subterranean formation 118 and coupled to a rig 110 on a surface 112 of the formation 118. The formation 118 can include one or more of a number of formation types, including but not limited to shale, limestone, sandstone, clay, sand, and salt. The surface 112 may be ground level for an on-shore application or the sea floor for an off-shore application. In certain embodiments, a subterranean formation 118 can also include one or more reservoirs in which one or more resources (e.g., oil, gas, water, steam) are located. In certain example embodiments, the wellbore 108 is cased with cement of other casing material, which is perforated to allow fluids to flow from the formation 118 into the well 108. In certain example embodiments, the well 108 is a multi-zone well.

A production tubing 106 is disposed downhole within the well 108. Fluids are recovered and brought to the rig 110 through the production tubing. In certain example embodiments, a production packer 104 is coupled to the production tubing 106. In certain example embodiments, the valve system 100 includes one or more flow control valves 102 coupled to the production tubing 106 at various linear portions. In certain example embodiments, the flow control valves 102 control the flow of fluid from the well 108 or formation 118 into the production tubing 106. In certain example embodiments, a packer 116 is placed between each flow control valve 102, thereby isolating each respective portion of the well 108. Placement of the flow control valves 102 and the packers 116 separates the well 108 into one or more well zones. Each of the flow control valves 102 is configured to independently control the flow rate of fluids from the reservoir into the production tubing at its respective zone, making it possible to normalize the flow rate across each of the well zones, and thus minimizing the aforementioned heel-toe effect. The valve system 100 can be used in any type of well system.

Figure 2:
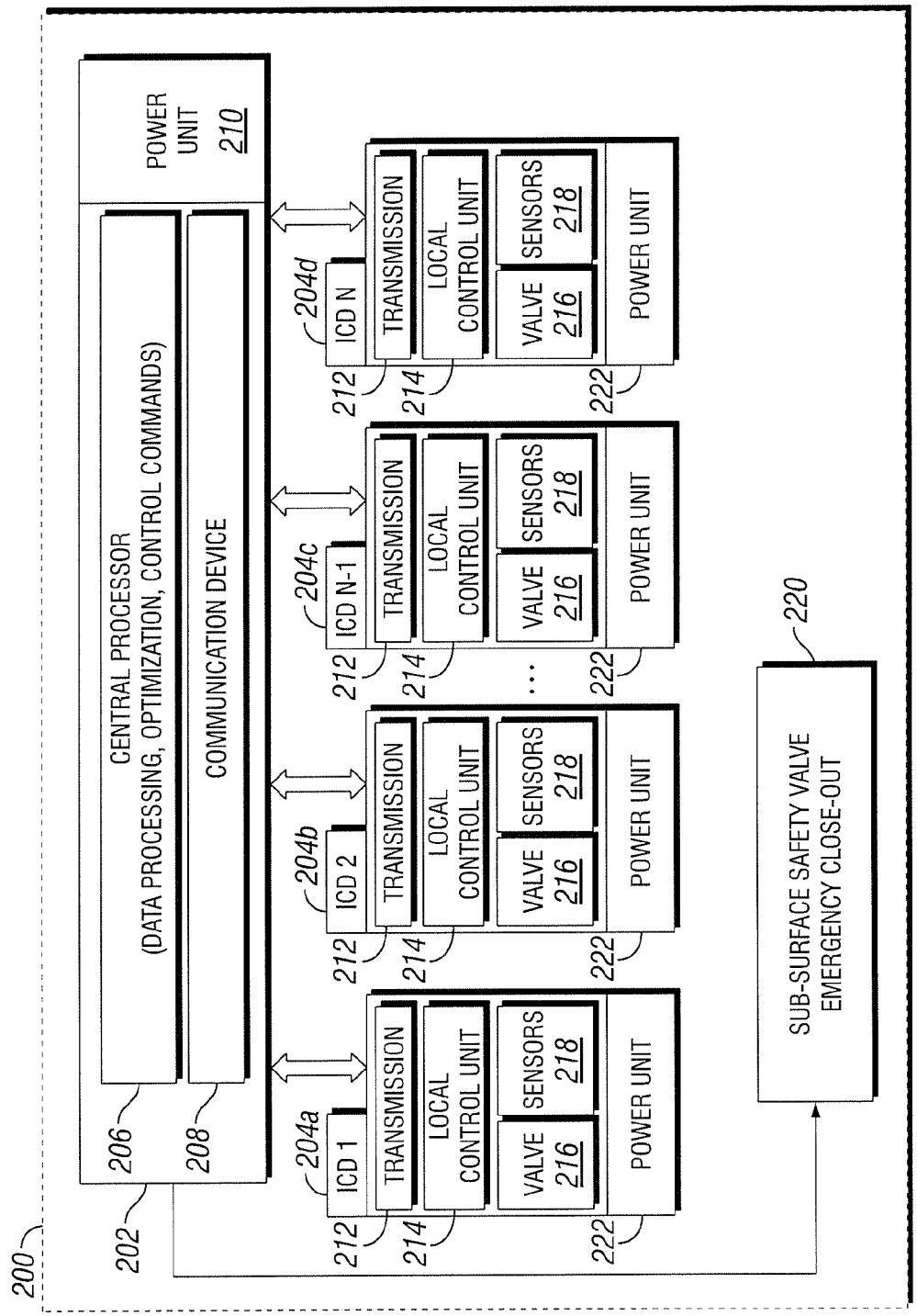
FIG. 2 illustrates a block diagram of a valve system comprising a central control unit and local control units, in accordance with example embodiments of the present disclosure.
Figure 3:
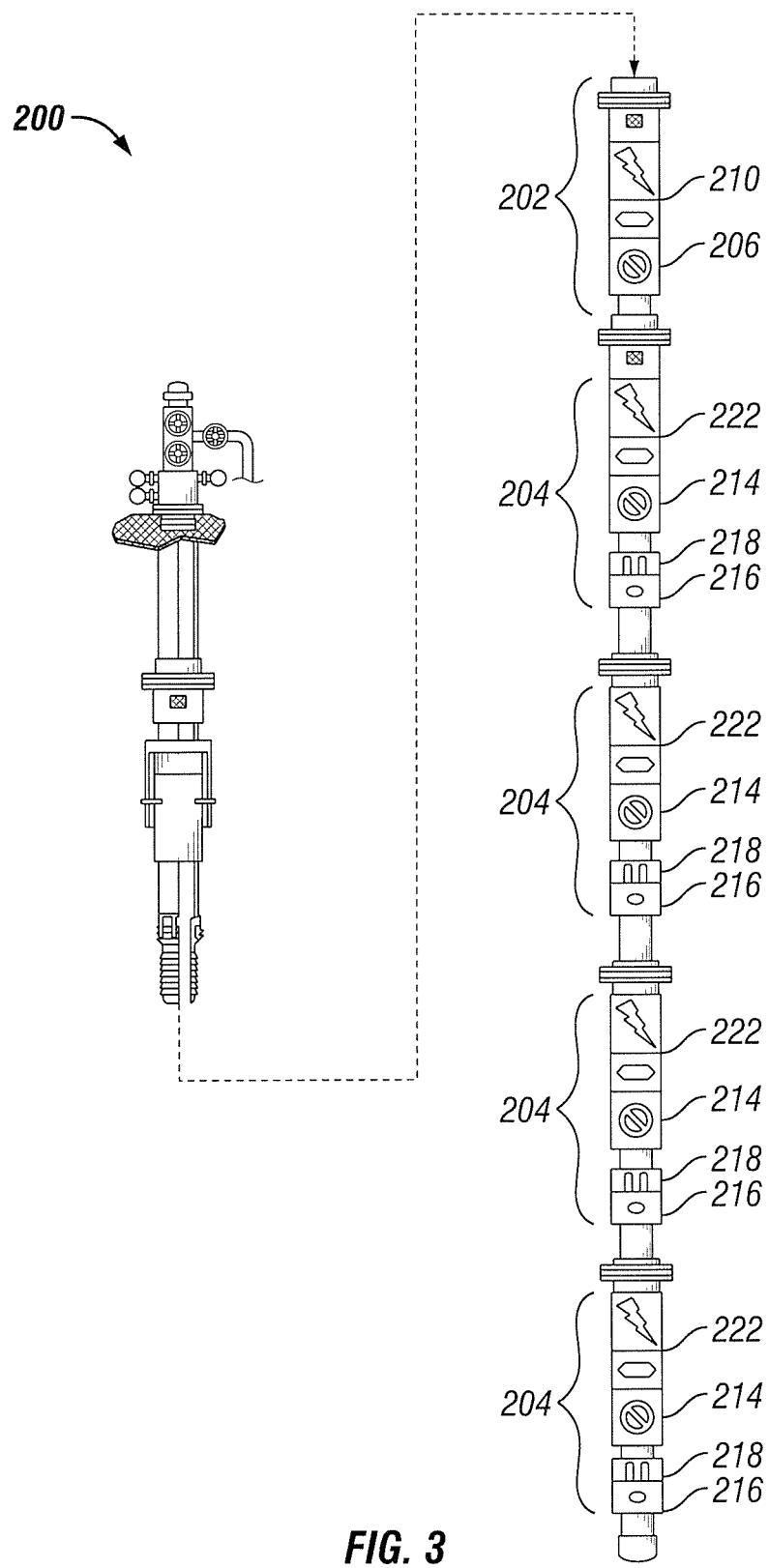
FIG. 3 illustrates a schematic diagram of a valve system comprising a central control unit and local control units, in accordance with example embodiments of the present disclosure.

FIGS. 2 and 3 illustrate a first example embodiment of the valve system 100, denoted therein by reference number 200, in which the valve system 200 comprises a central control unit 202 and one or more flow control devices, such as flow control devices 204a, 204b, 204c, and 204d (collectively "204"), having local control units 214. Specifically, FIG. 2 illustrates a block diagram of the first example embodiment of the valve system 200 and FIG. 3 illustrates a schematic diagram of the first example embodiment of the valve system 200. Referring to FIGS. 2 and 3, each of the flow control devices 204 are communicatively coupled to the central control unit 202. The central control unit includes a central processor 206 and a central communication device 208. In certain example embodiments, the central communication device 208 is combined with the central processor 206 and considered a part or function of the central processor 206. The central processor 206 also includes at least one memory module capable of storing a pre-programmed protocol and received data. In certain example embodiments the central communication device 208 enables communication with the one or more flow control devices 204 via a wired or wireless communication protocol. In certain example embodiments, the central control unit 202 includes a power unit 210. The power unit 210 may include a downhole power generation unit, a battery, another power generation and/or storage device, or other power source.

In certain example embodiments, each of the flow control devices 204 includes a local communication device 212 for communicating with the central communication device 208, a local controller 214, at least one valve 216, and one or more sensors 218. In certain example embodiments, the local communication device 212 is considered a part or function of the local controller 214. In one example, the local controller 214 of a particular flow control device 204 can communicate with the one or more sensors 218 and the one or more valves 216 associated with that flow control device 204 via a single cable. In another example, one cable can connect the one or more sensors 218 with the local controller 214 and a separate cable can connect the one or more valves 216 with the local controller 214. In certain example embodiments, each flow control device 204 also includes a local power unit 222 for powering the respective flow control device 204. In certain example embodiments, the valve 216 controls the flow of fluids from the respective portion of the formation 118 or well 108 into the production tubing 106. For example, the valve 216 can be opened to increase flow, choked back to decrease flow, or closed to stop flow. In certain example embodiments, the valve 216 is controlled by the local controller 214. In certain example embodiments, the local controller 214 controls the valve 216 based on a signal or command received from the central control unit 202. In certain example embodiments, the central control unit 202 sends individual control signals to each of the one or more flow control devices 204 for uniquely controlling the respective valves 216.

In certain example embodiments, the one or more sensors 218 monitor one or more parameters related to the respective flow control device 204 or the respective well zone. For example the one or more sensors 218 may include a flow meter, a pressure sensor, temperature sensor, acoustic sensor, phase detection sensor, and the like. Each of the one or more sensors 218 is configured to monitor at least one parameter such as flow rate, pressure, temperature, sound, and phase composition of fluids, respectively. In certain example embodiments, the one or more sensors 218 outputs the relevant data to the local controller 214 and the sensor data is then communicated to the central processor 206 of the central controller unit 202. In certain example embodiments, the central processor 206 includes, stored in memory, a pre-programmed control protocol which determines how to control each of the valves 216 based on the sensor data from the one or more flow control devices 204.

In certain example embodiments, the control protocol may be designed to normalize the flow rate across each of the one or more flow control devices 204. For example, the central processor 208 may read the current flow rate at each of the one or more flow control devices and determine that one of the flow control devices 204 is seeing an flow rate at its well zone that is significantly higher than that seen by the other flow control devices 204. The central processor 208 may, carrying out the control protocol, choke back the respective valve 216, thereby decreasing the flow rate to better match the flow rate at the other well zones. In certain example embodiments, the control protocol may dictate that a valve 216 be closed completely when certain conditions are sensed by the one or more sensors 218, such as the flow of water.

In certain example embodiments, the central control unit 202 is regularly monitoring the data received from the one or more sensors 218 of each flow control device 204, running the data through the control protocol, and controlling each flow control device 204 or valve 216 accordingly. Thus, the desired flow parameters are autonomously maintained. Since the central control unit 202 is deployed downhole as a part of the valve system 100, the flow control devices 204 can be controlled without running wireline to the surface and without human intervention. In certain example embodiments, this allows the valve system 100 to include a large number of flow control devices 204, creating a higher resolution of well zones, and thereby better controlling for flow discrepancies in the well 108. Furthermore, the valve system 100 enables faster control of the valves 216 when certain conditions are observed, as the flow control devices 204 do not need to wait for a human control response. Rather, the appropriate control response is received and carried out immediately. In certain example embodiments, the valve system 200 can instantaneously respond to downhole incidents through use of a sub-surface safety valve emergency close out 220. The sub-surface safety valve emergency close out 220 is a separate valve or collection of valves that can be used to close off the production tubing in certain incidents.

Figure 4:
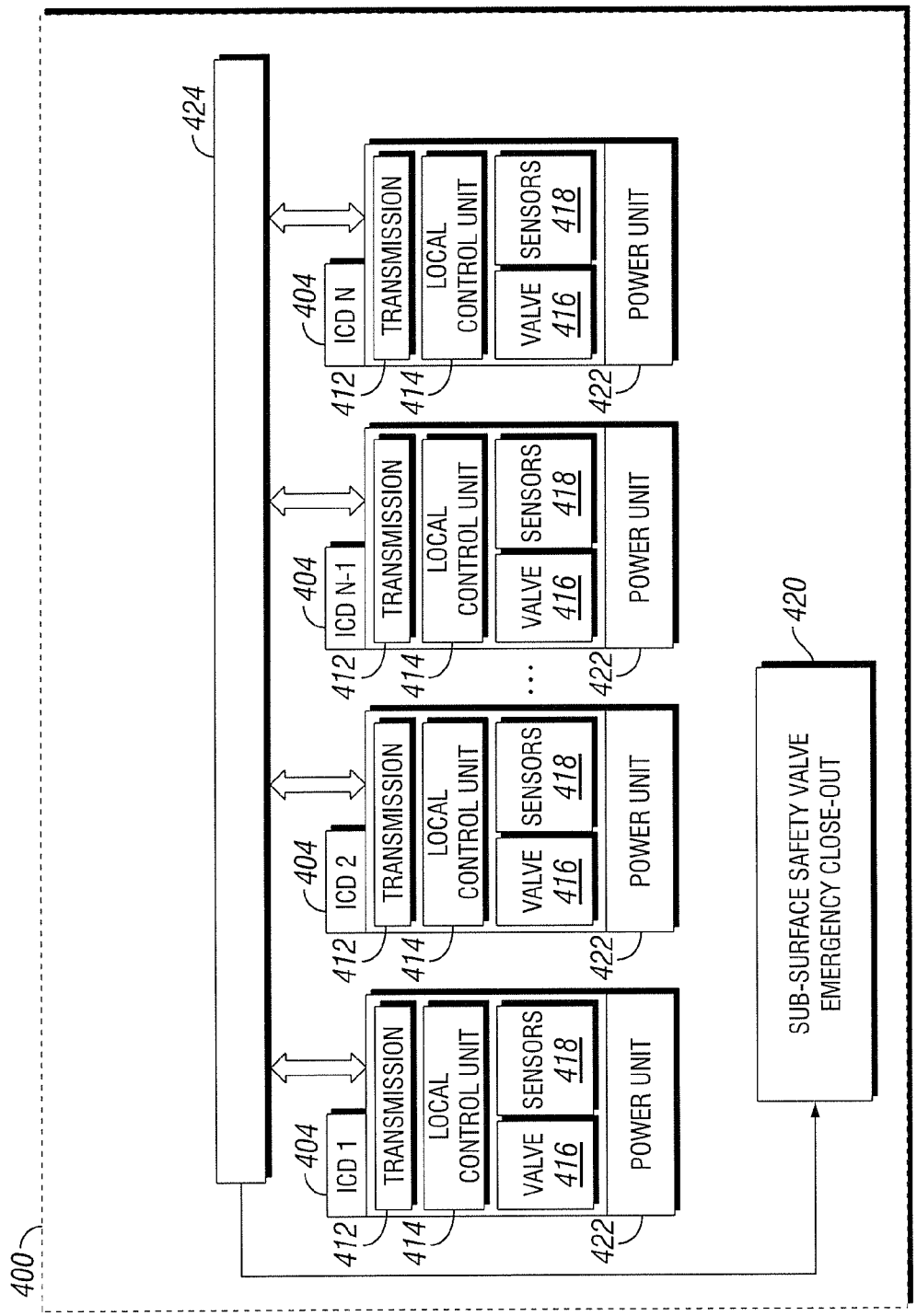
FIG. 4 illustrates a block diagram of a valve system comprising local control units, in accordance with example embodiments of the present disclosure.
Figure 5:
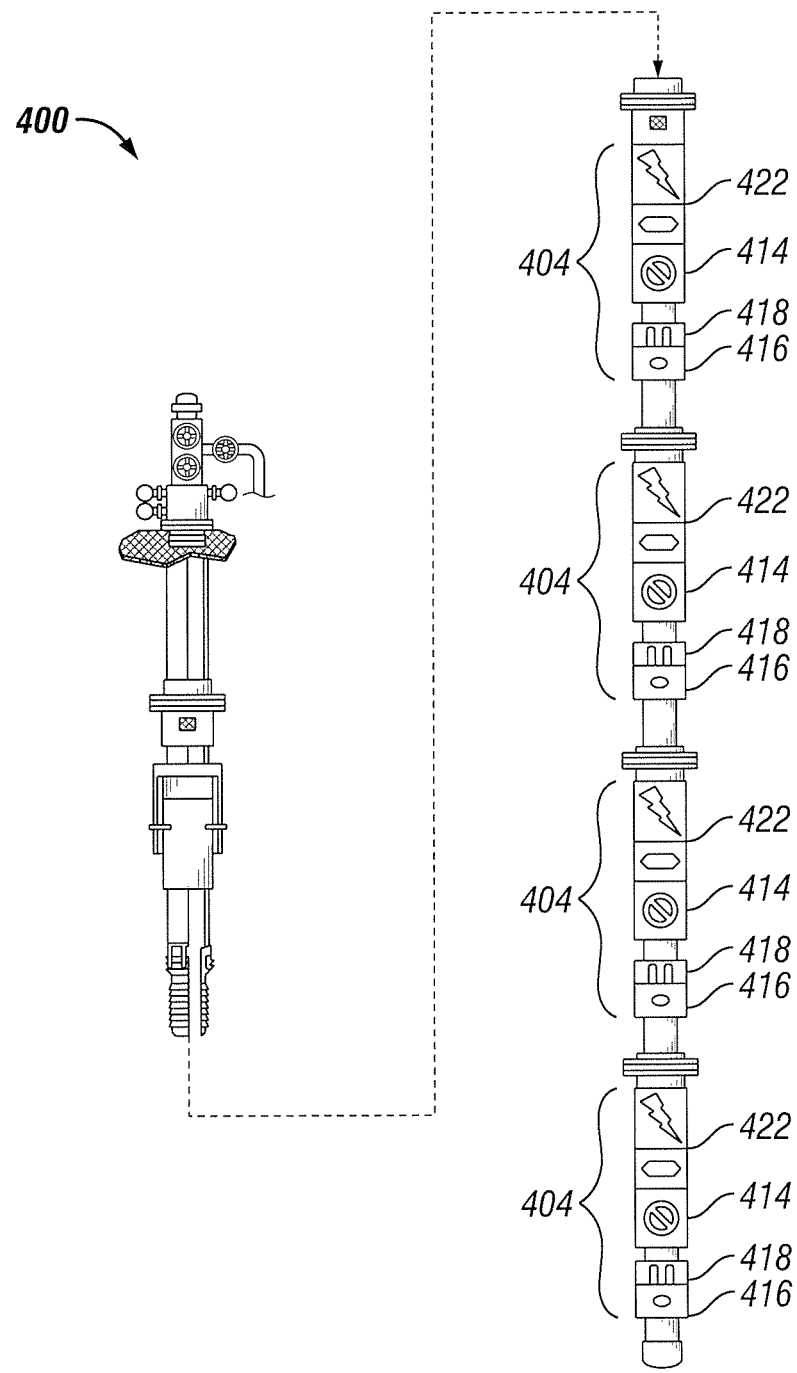
FIG. 5 illustrates a schematic diagram of a valve system comprising local control units, in accordance with example embodiments of the present disclosure.

FIGS. 4 and 5 illustrate a second example embodiment of the valve system 100, denoted therein by reference number 400, in which the valve system 400 includes one or more flow control devices 404. Specifically, FIG. 4 illustrates a block diagram of the second example embodiment of the valve system 400 and FIG. 5 illustrates a schematic diagram of the second example embodiment of the valve system 400. Referring to FIGS. 4 and 5, in certain such example embodiments, the valve system 400 does not include a central control unit 202. Rather, in certain of these example embodiments, the general functions of the central control unit 202 are performed by at least one of the flow control devices 404. In certain example embodiments, each of the flow control devices 404 are communicatively coupled to each other via wired or wireless communication protocols. The flow control devices 404 may be communicatively coupled via a communication protocol. In certain such embodiments, the flow control devices 404 are communicatively coupled to each other via a communication bus 424. In certain example embodiments, the flow control devices 404 communicate with each other wirelessly.

In certain example embodiments, each of the flow control devices 404 includes a local communication device 412 which enables communication with the other flow control devices 404. In certain example embodiments, each flow control device 404 further includes a local controller 414, at least one valve 416, one or more sensors 418, and a power unit 422. The power unit 422 may include a downhole power generation unit, a battery, another power generation and/or storage device, or other power source. As with the examples described in connection with FIGS. 2 and 3, the local controller 414 can communicate with the at least one valve 416 and the one or more sensors 418 via a single cable or multiple cables.

In certain example embodiments, the valve 416 in each flow control device 404 controls the flow of fluids from the respective portion of the formation 118 or well 108 into the production tubing 106. For example, the valve 416 can be opened to increase flow, choked back to decrease flow, or closed to stop flow. In certain example embodiments, the valve 416 is controlled by the respective local controller 414. In certain example embodiments, the one or more sensors 418 monitor one or more parameters related to the respective flow control device 404 or the respective well zone. For example, the one or more sensors 418 may include a flow meter, a pressure sensor, temperature sensor, acoustic sensor, phase detection sensor, and the like. Each of the one or more sensors 418 is configured to monitor at least one parameter such as flow rate, pressure, temperature, sound, and phase composition of fluids, respectively. In certain example embodiments, the one or more sensors 418 outputs the relevant data to the local controller 414.

In certain example embodiments, the local controller 414 includes, stored in memory, a pre-programmed control protocol which determines how to control each of the respective valve 416 based on the sensor data from the respective sensors 418 in order to achieve the desired flow conditions. For example, the local controller 414 may continuously adjust the respective valve 416 to maintain a certain flow rate. In certain example embodiments, the local controllers 414 control the respective valves 416 based not only on the sensor data from its respective sensors 418, but based on the sensor data of the other sensors 418 in the valve system 400. For example, a first of the flow control devices 404 in the valve system 400 receives the sensor data collected by the other flow control devices 404, via communication enabled by the communication devices 412. The first of the flow control devices 404 then determines, by running the sensor data from each of the flow control devices 404 through a pre-programmed control protocol, individual control commands for each of the valves 416 in each of the flow control devices 404. The first of the flow control devices 404 sends individual control signals to each of the one or more flow control devices 404 for uniquely controlling the respective valves 416.

In certain example embodiments, the control protocol may be designed to normalize the flow rate across each of the flow control devices 404. For example, the first of the flow control devices 404 may receive the current flow rate at each of the flow control devices 404 and determine that one of the flow control devices 404 is seeing an flow rate at its well zone that is significantly higher than that seen by the other flow control devices 404. The first of the flow control devices 404 may, carrying out the control protocol, send a control command for that flow control device 404 to choke back the respective valve 416, thereby decreasing the flow rate to better match the flow rate at the other well zones. In certain example embodiments, the control protocol may dictate that a valve 416 be closed completely when certain conditions are sensed by the one or more sensors 418, such as the flow of water. In certain example embodiments, the first of the flow control devices 404 is constantly monitoring the sensor data received from each flow control device 404, running the data through the control protocol, and controlling each flow control device 404 or valve 416 accordingly. Thus, the desired flow parameters are autonomously maintained across the different flow control devices 404 of the valve system 400. Additionally, in certain example embodiments, the valve system 400 can instantaneously respond to downhole incidents through the use of a sub-surface safety valve emergency close out system 420.

Figure 6:
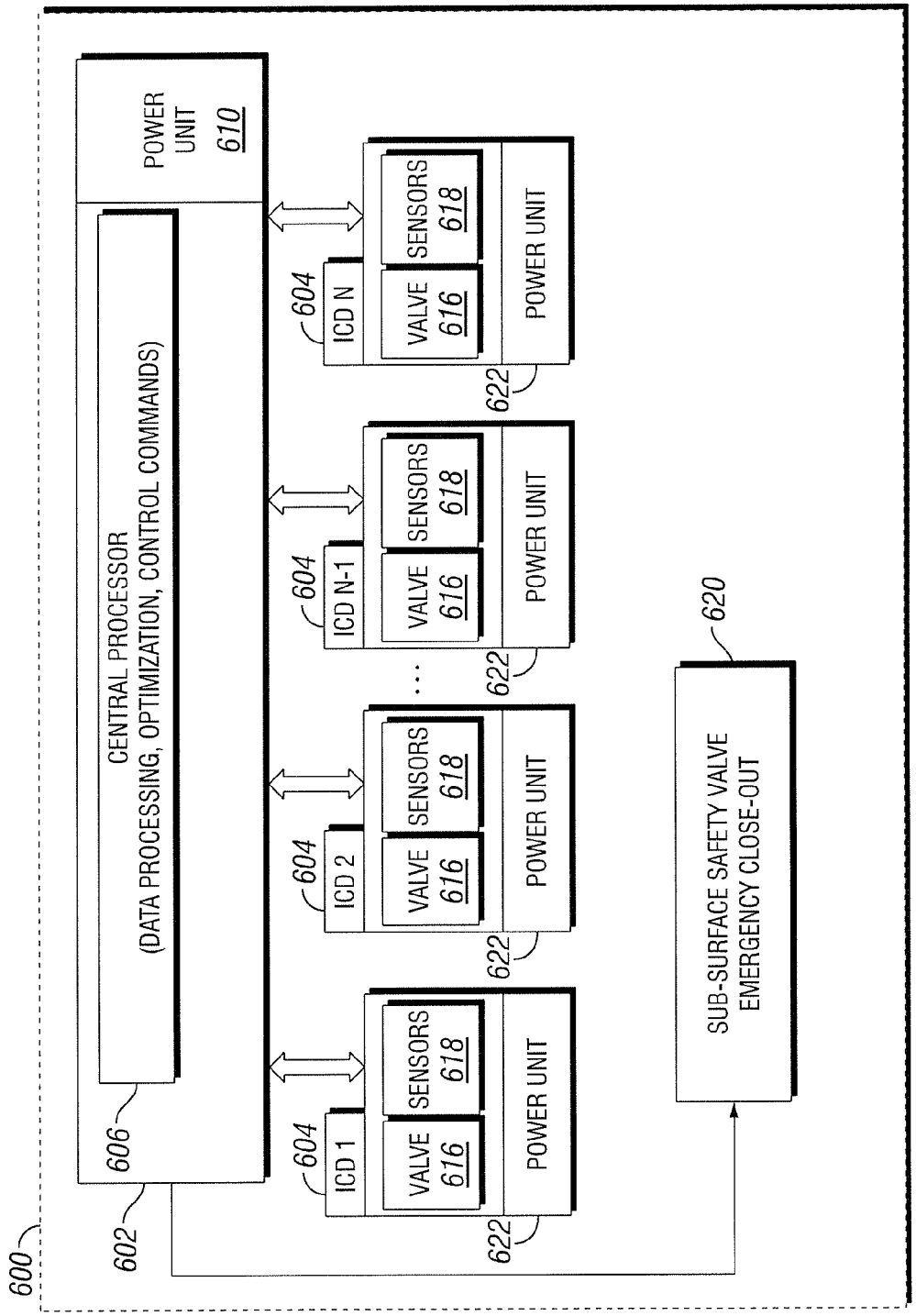
FIG. 6 illustrates a block diagram of a valve system comprising a central control unit, in accordance with example embodiments of the present disclosure.
Figure 7:
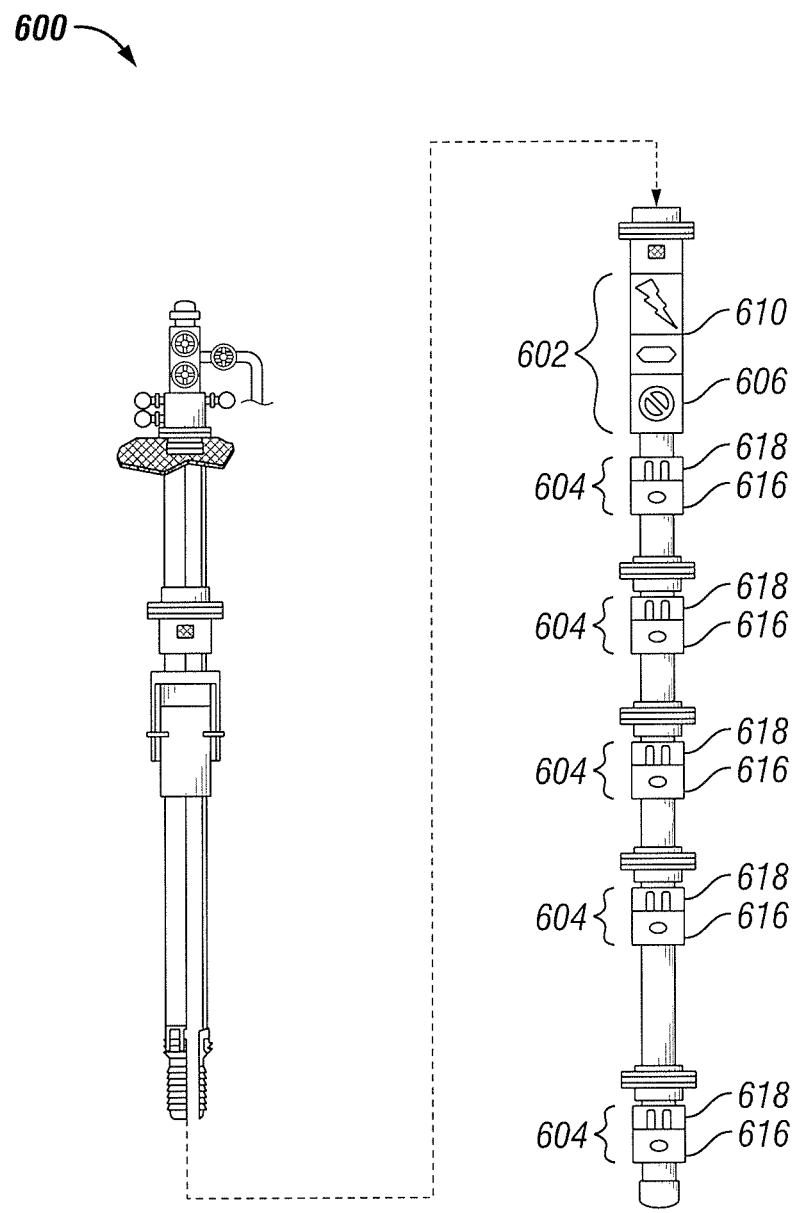
FIG. 7 illustrates a schematic diagram of a valve system comprising a central control unit, in accordance with example embodiments of the present disclosure.

FIGS. 6 and 7 illustrate a third example embodiment of the valve system 100, denoted therein by reference number 600, in which the valve system 600 comprises a central control unit 602 configured to directly control one or more valves 616 of one or more flow control devices 604. Specifically, FIG. 6 illustrates a block diagram of the third example embodiment of the valve system 600 and FIG. 7 illustrates a schematic diagram of the third example embodiment of the valve system 600. Referring to FIGS. 6 and 7, in certain example embodiments, the valve system 600 includes a central control unit 602 and one or more flow control devices 604. The central control unit 602 includes a central processor 606. The central processor 606 includes at least one memory module capable of storing a pre-programmed protocol and received data.

In certain example embodiments, each of the flow control valves 604 includes at least one valve 616 and one or more sensors 618. In certain example embodiments, each flow control device 604 also includes a local power unit 622 for powering the respective flow control device 604. In such example embodiments, each of the valves 616 and sensors 618 are communicatively coupled to the central control unit 602. The central control unit 602 can communicate with the valves 616 and sensors 618 via a single cable, multiple cables, or wirelessly. In certain example embodiments, each of the sensors 618 monitors one or more parameters related to the respective flow control device 604 or the respective well zone. For example the one or more sensors 618 may include a flow meter, a pressure sensor, temperature sensor, acoustic sensor, phase detection sensor. Each of the one or more sensors 618 is configured to monitor at least one parameter such as flow rate, pressure, temperature, sound, phase composition of fluids, respectively. In certain example embodiments, the sensors 618 output the measured data to the central controller unit 602, where the data is processed.

In certain example embodiments, the valves 616 are controlled by the central control unit via control signals. The valves 616 control the flow of fluids from the respective portion of the formation 118 or well 108 into the production tubing 106. For example, the valve 616 can be opened to increase flow, choked back to decrease flow, or closed to stop flow. In the example embodiments illustrated in FIGS. 6 and 7, the central control unit 602 sends individual control signals to each of the valves 616 for uniquely controlling the individual valves 616. The embodiments described herein can be used with or without modifications for injection wells in which injection fluids such as water, polymers, gas, steam or other fluid media flow through the production tubing 106 to the well 108 or the formation 118 to enhance the productivity of the reservoir.

In certain example embodiments, the central processor 606 includes, stored in memory, a pre-programmed control protocol which determines how to control each of the valves 616 based on the sensor data from the sensors 618 of the one or more flow control devices 604. In certain example embodiments, the control protocol may be designed to normalize the flow rate across each of the one or more flow control devices 604. For example, the central processor 606 may read the current flow rate at each of the one or more flow control devices 604 and determine that one of the flow control devices 604 is seeing an flow rate at its well zone that is significantly higher than that seen by the other flow control devices 604. The central processor 606 may, carrying out the control protocol, choke back the respective valve 616, thereby decreasing the flow rate to better match the flow rate at the other well zones. In certain example embodiments, the control protocol may dictate that a valve 616 be closed completely when certain conditions are sensed by the one or more sensors 618, such as the flow of water. In certain example embodiments, the central control unit 602 is constantly monitoring the data received from the one or more sensors 618 of each flow control device 604, running the data through the control protocol, and controlling each valve 616 accordingly. Thus, the desired flow parameters are autonomously maintained. In certain example embodiments, the valve system 600 can instantaneously respond to downhole incidents through the use of a sub-surface safety valve emergency close out system 620.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An autonomous active flow control valve system, comprising:
   a first downhole flow control device;
   a second downhole flow control device, wherein the first downhole flow control device and the second downhole flow control device each comprise:
      a valve;
      a local control unit coupled to the valve and configured to control actuation of the valve;
      a sensor configured to sense at least one parameter; and
   a central control unit disposed downhole and communicatively coupled to the local control unit of the first downhole flow control device and to the local control unit of the second downhole flow control device, the central control unit comprising a central processor configured to:
      receive an output of the sensor of the first downhole flow control device and an output of the sensor of the second downhole flow control device;

provide a first control signal to the local control unit of the first downhole flow control device for controlling the valve of the first downhole flow control device; and provide a second control signal to the local control unit of the second downhole flow control device for controlling the valve of the second downhole flow control device, wherein the first control signal and the second control signal are generated at least based on a pre-programmed protocol stored in the central processor.

2. The autonomous active flow control valve system of claim 1, comprising:
one or more power units disposed downhole and coupled to the central control unit, the first downhole flow control device, or both.

3. The autonomous active flow control valve system of claim 1, further comprising an emergency valve closeout mechanism coupled to the central control unit.

4. The autonomous active flow control valve system of claim 1, wherein the central control unit is wirelessly communicative with the first downhole flow control device and the second downhole flow control device.

5. The autonomous active flow control valve system of claim 1, wherein the first sensor is configured to monitor flow rate, pressure, temperature, sound, phase composition of fluids, or any combination thereof with respect to a first well zone and wherein the second sensor is configured to monitor flow rate, pressure, temperature, sound, phase composition of fluids, or any combination thereof with respect to a second well zone.

6. The autonomous active flow control valve system of claim 1, wherein the valve controls a flow of fluid from a reservoir into the downhole flow control device.

7. The autonomous active flow control valve system of claim 1, wherein the central processor is configured to generate the first control signal to control the valve of the first downhole flow control device via the local control unit of the first downhole flow control device and further based on the output of the sensor of the first downhole flow control device and the output of the sensor of the second downhole flow control device.

8. The autonomous active flow control valve system of claim 1, wherein the central control unit, the first downhole flow control device, and the second downhole flow control device are coupled to a downhole pipe string.

9. An autonomous active flow control valve system, comprising:
a first downhole flow control device comprising:
a first valve configured to control the flow of a fluid from a reservoir into the valve system;
a first local controller coupled to the first valve and configured to control actuation of the first valve; and
at least one first sensor communicatively coupled to the first local controller and configured to sense at least one parameter relevant to the first downhole flow control device; and
a second downhole flow control device comprising:
a second valve configured to control the flow of a fluid from a reservoir into the valve system;
a second local controller coupled to the second valve and configured to control actuation of the second valve, the second local controller communicatively coupled to the first local controller; and
at least one second sensor communicatively coupled to the second local controller and configured to sense at least one parameter relevant to the second downhole flow control device, wherein the first local controller controls the first valve and the second valve and wherein the first local controller controls the first valve based on one or more outputs of the at least one first sensor, one or more outputs of the at least one second sensor, and based on a pre-programmed protocol stored in the first local controller.

10. The autonomous active flow control valve system of claim 9, wherein the first local controller maintains a normalized flow rate across the first and second downhole flow control devices.

11. The autonomous active flow control valve system of claim 9, wherein the first local controller reduces a flow rate at one of the first and second downhole flow control devices to match that of the other of the first and second downhole flow control devices.

12. The automatic active flow control valve system of claim 9, wherein the first downhole flow control device communicates wirelessly with the second downhole flow control device.

13. The automatic active flow control valve system of claim 9, wherein the at least one first sensor and the at least one second sensor are configured to monitor flow rate, pressure, temperature, sound, phase composition of fluids, or any combination thereof with respect to a well zone.

14. The automatic active flow control valve system of claim 9, wherein the first local controller controls the second valve based on one or more outputs of the at least one first sensor and the at least one second sensor, and based on a pre-programmed protocol stored in the first local controller.

15. The automatic active flow control valve system of claim 9, wherein the second local controller controls the second valve based on one or more outputs of the at least one first sensor and the at least one second sensor, and based on a pre-programmed protocol stored in the first local controller.

16. An autonomous active flow control valve system, comprising:
a first downhole flow control device comprising:
a first valve; and
a first sensor configured to sense at least one parameter;
a second downhole flow control device comprising:
a second valve; and
a second sensor configured to sense the at least one parameter; and
a central control unit disposed downhole and communicatively coupled to the first downhole flow control device and to the second downhole flow control device, the central control unit comprising a central processor configured to:
receive an output of the first sensor;
receive an output of the second sensor; and
provide one or more control commands to the first valve, the one or more control commands generated based on at least the output of the first sensor, the output of the second sensor, and a pre-programmed protocol stored in the central processor.

17. The autonomous active flow control valve system of claim 16, wherein the central processor is configured to provide one or more second control commands to the second valve, the one or more second control commands generated based on the pre-programmed protocol stored in the central processor.

18. The autonomous active flow control valve system of claim 16, wherein the central control unit, the first downhole flow control device, and the second downhole flow control device are coupled to a downhole pipe string.

19. The autonomous active flow control valve system of claim 16, wherein the central control unit maintains a normalized flow rate across each of the at least one downhole flow control devices.

* * * * *